United States Patent Office 3,018,809
Patented Jan. 30, 1962

3,018,809
FLEXIBLE NON-PNEUMATIC TIRE
Lucien A. Bernard, 11 Rue St. Leonard, Nantes, France, assignor of one-half to Jules E. Briche, Fort Lauderdale, Fla.
Filed Nov. 10, 1959, Ser. No. 852,042
1 Claim. (Cl. 152—41)

This invention relates to a non-pneumatic resilient tire for use in motor vehicles, and more particularly relates to a unitary resilient tire in which the ground-engaging portion, the spokes, and wheel rim engaging portions are integrally joined and are each made of a resilient material.

Many attempts have been made to replace the usual pneumatic tire, currently employed on motor vehicles, by a resilient non-pneumatic tire. One of the problems encountered in providing an effective and long-lived non-pneumatic resilient tire is that of constructing the tire parts as a unit. The prior attempts at constructing an adequate resilient non-pneumatic tire have all resulted in a tire construction in which spokes and ground-engaging portions are not integral but are constructed as separate units, which construction gives rise to the problem of adequately connecting the ground-engaging portion to the vehicle wheel rim so that the tire will withstand all the abuses and stresses encountered.

It is an object, therefore, of the present invention to provide a new resilient non-pneumatic tire which is capable of withstanding severe road stresses and strains.

It is a further object of this invention to provide a non-pneumatic resilient tire in which all the elements are constructed integrally as a unit so as to better withstand the normal stresses to which a tire is subjected.

Still another object of the present invention is to provide a unitary integrally formed resilient non-pneumatic tire which may be readily mounted upon the standard motor vehicle wheel rim.

Figure 1:
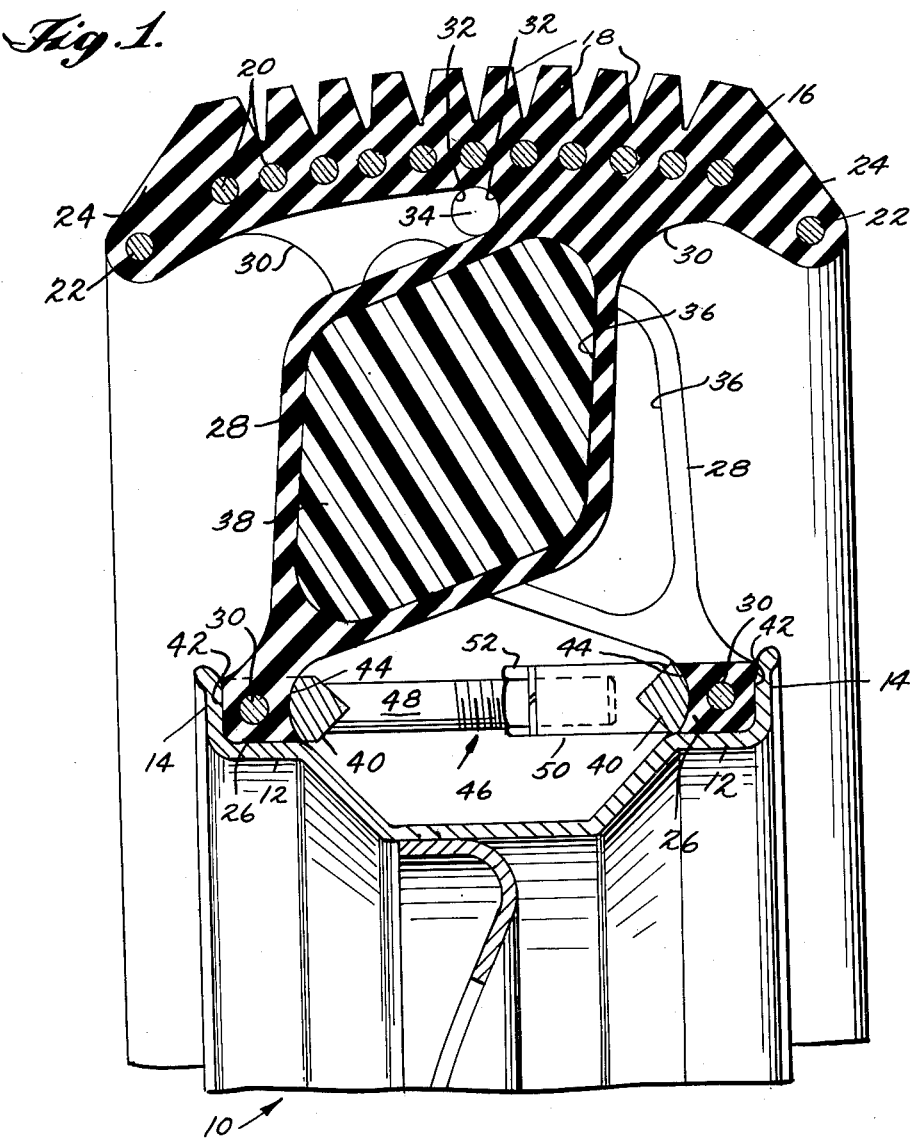
Figure 2:
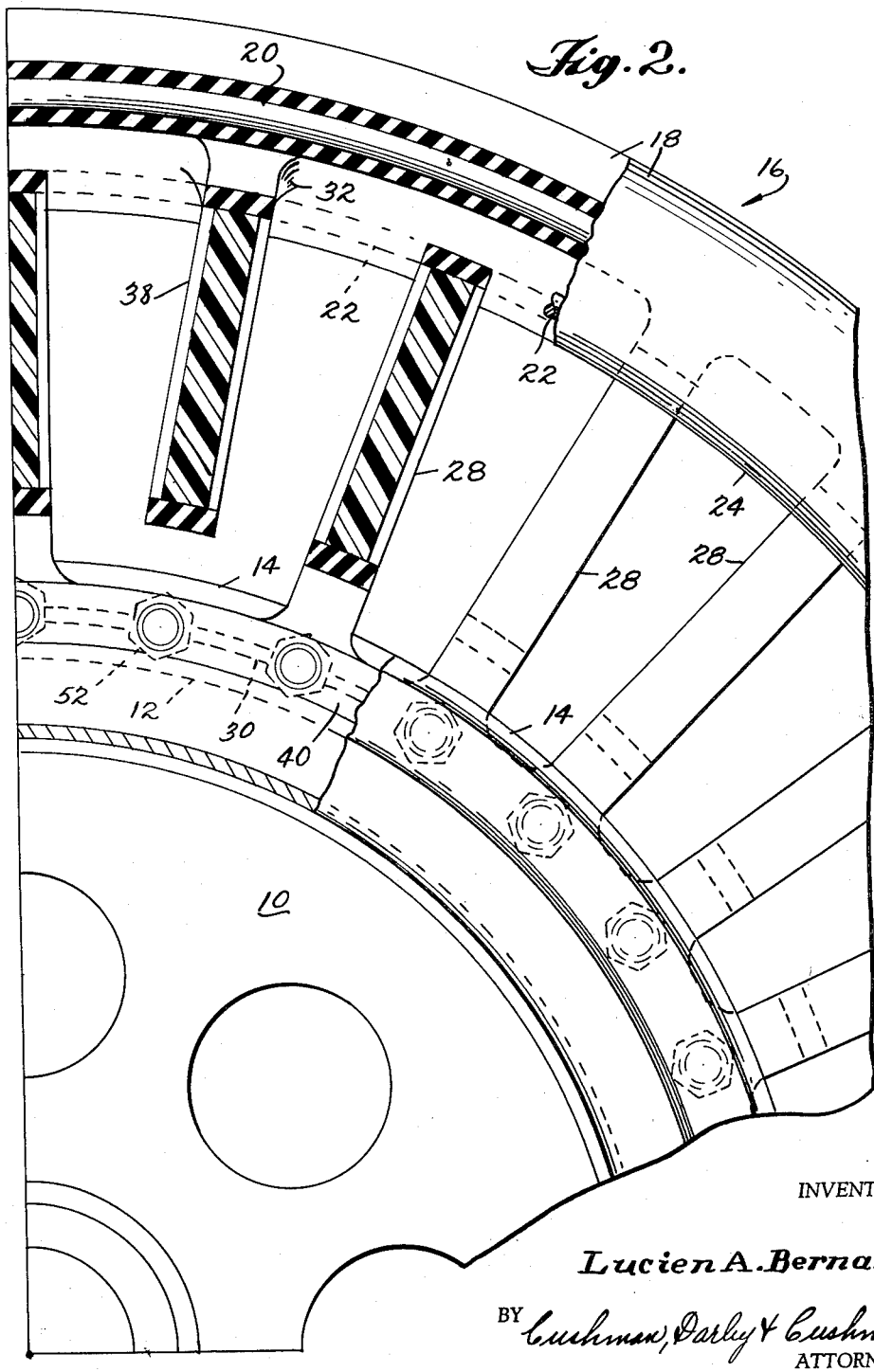

These and further objects and advantages will become readily apparent to those skilled in the art upon a study of the following detailed description taken in conjunction with the appended drawings in which:

FIG. 1 is a vertical cross-sectional view taken through one of the spokes of the tire of the present invention; and FIG. 2 is a fragmentary side view of the tire of the present invention, partially in section, and partially in elevation.

The preferred embodiment of the present invention is best illustrated in FIG. 1 in which the usual motor vehicle wheel rim is indicated generally at 10 and has the usual peripheral tire-engaging shoulder portions 12 and peripheral flange portions 14. The resilient non-pneumatic tire of this invention comprises an annular ground-engaging portion 16 having the usual tire treads 18 disposed within its outer peripheral face. Ground-engaging portion 16 is further provided with a plurality of annular metallic re-enforcing members 20 disposed internally and adjacent to the treads 18. Additional annular metallic re-enforcing members 22 may be disposed within the outermost portion 24 of ground-engaging portion 16. A pair of annular wheel rim engaging portions 26 is integrally formed with ground-engaging portion 16 and is connected thereto by integral spokes 28. The annular wheel rim engaging portions 26 are provided with annular metallic re-enforcing members 30 disposed substantially centrally therein. The spokes 28 extend diagonally across each other from wheel rim engaging portions 26 so that the outer end of the spokes 28 is integrally connected with the opposite side of the inner peripheral face of annular ground-engaging portion 16. Preferably, each of the spokes 28 is radially spaced about the entire circumference of wheel rim engaging portions 26 and annular ground-engaging portion 16, with each adjacent spoke extending diagonally opposite. The outer ends of each spoke are externally curved, as at 30, so as to provide a strong joint with ground-engaging portion 16, and the outer ends are internally curved, as at 32, so as to provide an annular open passage 34 extending the entire circumference of the inner peripheral face of ground-engaging portion 16. This annular circumferential passage 34 provides for increased resiliency of the tire and also facilitates the cooling of the inner peripheral face of ground-engaging portion 16.

In addition, each of the spokes 28 has an enlarged center portion 36 extending substantially the entire distance between the inner peripheral face of ground-engaging portion 16 and wheel rim engaging portions 26, with the enlarged portion 36 being preferably diamond-shaped, although not specifically limited to such configuration. The interior of the enlarged portion 36 is filled with a resilient material 38 different than the resilient material employed in the remaining portions of the tire. The filler material placed in the enlarged portions 36 of spokes 28 may be cork, rubber, or any pliable plastic and serves not only to strengthen the spokes 28 but also serves to control the amount of resiliency of the tire, depending upon the usage to which the tire is to be put. If it is necessary for the tire to withstand severe road conditions or high loads, a less resilient filler may be used; whereas, if the tire is only to be subjected to normal road conditions, a relatively more resilient filler material may be employed. It is to be understood in this regard that the tire proper may be constructed either of rubber or a strong resilient plastic, or even a combination of both, as desired.

The tire of the present invention is firmly secured to the wheel rim 10 so that no matter what stress or strain it encounters it will at all times be firmly connected. The connecting elements comprise a pair of annular metallic rings 40 which may, in turn, comprise two semicircular portions. The tire is placed upon the wheel rim 10 so that the outer surface 42 of the wheel rim engaging portions 26 abut the inner face of the peripheral flanges 14 of the wheel rim. Annular metallic rings 40 are disposed in abutting relationship with the inner circumferential face 44 of wheel rim engaging portions 26. A plurality of telescoping brace members 46, comprising a threaded portion 48 and a cooperating socket portion 50 are radially spaced and extend axially between the annular metallic rings 40. By turning the nut 52 disposed on the threaded portion 48 of telescoping braces 46, the braces are extended so as to press the rings 40 against the inner circumferential faces 44 of the wheel rim engaging portions 26, so that the latter are firmly clamped between the rings 40 and the peripheral flanges 14 of wheel rim 10. Although the axial spacing of braces 46 is illustrated so that there is one brace for each spoke 28, it is to be understood that the spacing may be varied, so that more or less braces may be employed, as desired.

It will thus be seen that there has been provided by this invention a structure in which the various objects hereinbefore set forth, together with many practical advantages, are successfully achieved. As various possible embodiments may be made of the mechanical features of the above invention, all without departing from the scope thereof, it is to be understood that all matter hereinbefore set forth or shown in the accompanying drawings is to be interpreted as illustrative and not in a limiting sense.

I claim:

In combination with an annular tire rim having radially extending flange portions and peripheral flange portions joined thereto defining a generally rectangular and annular recess about the periphery of said tire rim, a resilient tire wheel including an annular ground engaging portion having tire tread in its outer peripheral face, a plurality of axially spaced internal reinforcing members disposed in said annular ground engaging portion, a pair of annular wheel rim engaging portions each having an annular reinforcing member disposed therein and outside walls generally perpendicular to the axis of the said tire rim, said wheel rim engaging portions fitting in the axially opposed ends of the rectangular recess about the periphery of said tire rim, a plurality of radially extending integral spokes connecting said annular wheel rim and ground engaging portions, said spokes extending diagonally across each other from said annular wheel rim engaging portions to the opposite side of the inner peripheral face of said annular ground engaging portion, each of said spokes having an enlarged portion, said enlarged portions being filled with a resilient material different from the tire, and means to firmly engage said annular wheel rim engaging portions in the annular peripheral recess of said tire rim including axially extending telescoping brace members joined to said pair of engaging portions providing an axial engagement of the outside surfaces thereof with the inside surfaces of said radially extending flange portions.

References Cited in the file of this patent

UNITED STATES PATENTS

| 1,072,700 | Clark | Sept. 9, 1913 |

FOREIGN PATENTS

| 644,915 | France | June 25, 1928 |
| 1,071,651 | France | Mar. 10, 1954 |
| 530,651 | Italy | July 13, 1955 |